United States Patent Office.

JULES THEODORE ANATOLE MALLET, OF PARIS, FRANCE, ASSIGNOR TO JEAN MARIE ONESIME TAMIN, OF SAME PLACE.

Letters Patent No. 73,540, dated January 21, 1868.

IMPROVED PROCESSES FOR PRODUCING OXYGEN AND CHLORINE.

*The Schedule referred to in these Letters Patent and making part of the same.*

TO ALL WHOM IT MAY CONCERN:

Be it known that I, JULES THEODORE ANATOLE MALLET, of Paris, France, have invented a new and improved Process for Producing at will, conjointly or separately, Oxygen and Chlorine, by using the same substance; and I do hereby declare that the following is a full, clear, and exact description of the same.

The nature of my invention consists in applying a new and useful process for producing oxygen and chlorine in any desired quantity, either together or separately, by using the same substance over and over again, without waste or loss of material.

The substance I employ for this purpose is the sub-chloride of copper, ($Cu_2 Cl$,) which is transformed by the action of the oxygen of the air into an oxichloride, which oxichloride parts with its oxygen when exposed to a dark red heat, and then returns to its original state of a sub-chloride, when allowed to cool under exposure to a current of air in any suitable apparatus, to be employed over again for the production of oxygen, by a repetition of the same operation of heating.

The apparatus which I make use of are cylindrical cast-iron retorts, lined with fire-clay, porcelain, grit, or any suitable refractory coating to protect the metal from the action of the gases and the material contained in the retorts; and for the better preservation of the metal from the action of the chloride of copper, by being imbibed in the clay lining, an enamel coating, having a base of borate, silicate, phosphate of copper, or any other efficient agent, may be spread on the surface of the lining. At the bottom of the retorts are openings to be closed with clay plugs, and in one end of the retort is placed an exit-tube, leading to a gasometer or suitable receiving-vessel for holding the gas to be evolved. The retorts are placed horizontally in a furnace, and supported by a system of rollers, which allows of their rotation on their axes with the least possible friction.

The oxichloride before mentioned, is mixed with fifteen to twenty per cent. of inert material, such as kaolin, sand, powdered porcelain, bricks, &c., and it is placed in the retort loosely, to remain permanently while the repeated operations previously referred to are continued.

If it be desired to produce oxygen alone, the retorts in the furnace are heated gradually and uniformly, by being slowly and continually rotated, so as to agitate and mix the material within, until the temperature is raised to the requisite maximum of a dark red. The oxygen gas then evolved, passes through the exit-tube, through a washing-vessel, and thence to a gasometer or collecting-vessel, to be employed for heating or lighting, and other purposes, as desired.

If the operation is conducted upon an extensive scale, a sufficient number of retorts are required to allow of continuous working by changing them in the furnace, and, when the evolution of oxygen gas has subsided, after about two hours exposure to red heat, the retort is removed, by means of suitable hoisting-apparatus, through the top of the furnace, to be replaced by another retort; but if the operation is conducted upon a small scale, the retorts are allowed to get cool in the furnace, without being removed.

I will now describe the mode of revivifying the material to renew the operation just explained: When the retort is moderately cooled, even at the temperature of 302° to 392° Fahrenheit, and while still being rotated, jets of water or steam are projected upon it, lowering the temperature immediately to 212° or less. A draught of air is then introduced from a chimney or blower, when the color of the material is changed, and it is completely converted or transformed again into oxichloride within a period of two or three hours, care being taken to prevent the material from becoming too dry and blowing away, by injecting some water or steam in fine jets. The heat retained in the retort, and developed by the reaction, will expel the excess of water, and the retort may be heated again, as before, for the production of oxygen gas. The rotation of the retort is to be continued during all the operations.

For the production of chlorine and oxygen combined, chlorhydric acid is injected instead of water or steam, either in the liquid state or in the state of vapor or gas, during the process of revivification, and its action is combined with that of the air-current; or again, after the revivification has been effected as for the oxygen alone, the chlorhydric acid may be added, either in a liquid or gaseous state, care being taken, if the acid is liquid, not to inject too much at a time to render the material in the retort too wet, and in order that the temperature may be preserved sufficiently to drive off the excess of water. By the combined or simultaneous action of the water or steam, the air and chlorhydric acid, there will be obtained a mixture of oxichloride and chloride, (Cu Cl,) or chloride alone, according to the quantity of acid introduced, which, when distilled, will yield the oxygen and chlorine gas combined, or chlorine alone. The chlorine is retained in alkaline dissolutions or solutions of lime, &c., or by powdered lime, and the oxygen, if any, is collected into a gasometer or otherwise.

The necessary amount of acid to saturate the whole oxichloride and transform it into chloride, (Cu Cl,) being, when the liquid of commerce is employed, equal to fifty to sixty per cent. of the weight of the material, it is evident that it must be introduced slowly and gradually, in order that the water of the acid, equal to sixty to seventy per cent., shall be eliminated. The retort should be maintained at about 175° to 212° Fahrenheit, which is very easy when the retort is kept in the furnace; and when it is removed to be replaced, as described, for a continuous operation, the retort may be kept at the proper temperature by placing it in a supplemental furnace or shell, heated by the waste heat or steam.

Instead of rotating retorts for the agitation of the material, the same object may also be accomplished with stationary retorts by applying suitable stirring-apparatus, either horizontal or vertical in position.

The simultaneous production of two gases, such as oxygen and chlorine, in the same apparatus, and by using as it were the same mode of operation, may prove very advantageous, or by making use of the chlorine for bleaching purposes, or for preparing discoloring and disinfecting-chlorides, and the oxygen for heating and lighting purposes. The production of these gases may be equal to any demand.

For continuous operation three sets of retorts are required, viz, one set for the furnace, another for cooling, and another for the revivification part of the process, all being used simultaneously. A complete operation requires from eight to ten hours, and thus, with three sets of retorts, each set may perform two or three operations every twenty-four hours.

If oxygen only is to be produced, about one hundred and five cubic feet per four hundred and forty pounds of material may be obtained. If chlorine only, there will be obtained one hundred and twenty or one hundred and forty cubic feet per two hundred and twenty pounds, say eighty to ninety pounds of chlorine and solid lime.

By proceeding with this simultaneous production, intermediate variable quantities may be had, proportionate to the amount of acid employed.

The decomposition of the material for producing chlorine and oxygen may be facilitated by an injection of steam into the retort during the distilling operation. The steam should then be superheated, and the retort in this case should not be raised to a red heat, so as to avoid the decomposition of water at the contact of the material, in which case the difference between the distilling and the revivifying being less, it will not be necessary to take the retorts out of the furnace, and the supplemental furnace or shell may be dispensed with. It is obvious, also, that a mixture of gas and water and steam issuing together from the retort, some suitable arrangement is necessary for condensing and collecting the steam and water, and allowing the gas to pass freely.

Having thus described my invention, I claim as new, and desire to secure by Letters Patent—

The process for producing, conjointly or separately, oxygen and chlorine gas, substantially as herein described.

J. T. A. MALLET.

Witnesses:
F. F. RANDOLPH,
JAMES HAND.